G. H. BAUMANN.
COMBINED KETTLE AND STRAINER.
APPLICATION FILED APR. 18, 1916.
1,224,058.
Patented Apr. 24, 1917.
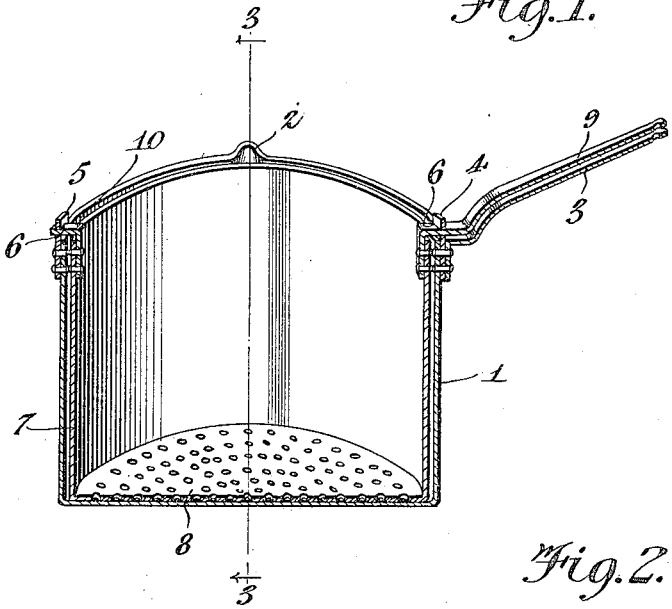
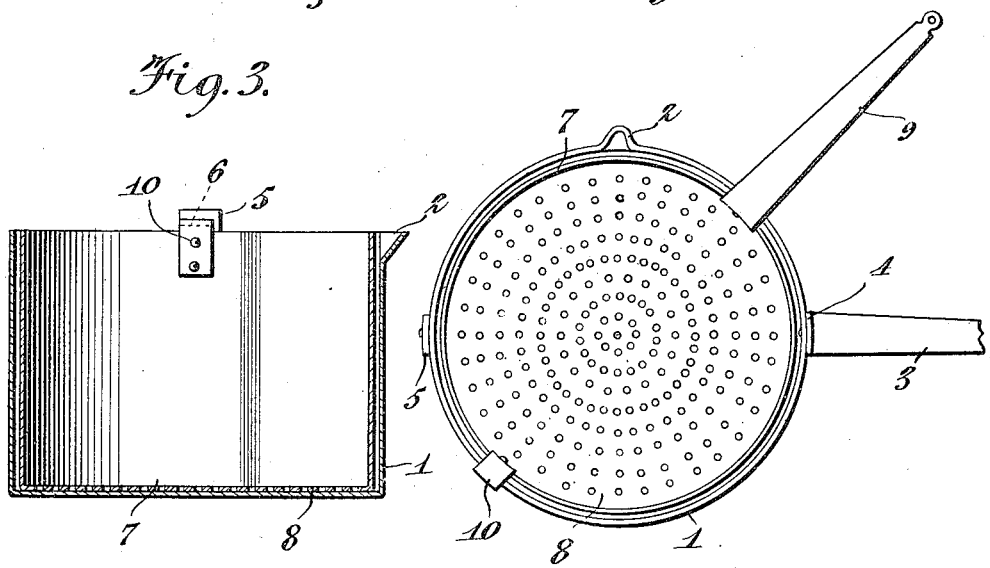
Witnesses
Frederick W. Ely
J. W. Garner
Inventor
George H. Baumann.
By Victor J. Evans
Attorney

UNITED STATES PATENT OFFICE.

GEORGE H. BAUMANN, OF MILWAUKEE, WISCONSIN.

COMBINED KETTLE AND STRAINER.

1,224,058.   Specification of Letters Patent.   Patented Apr. 24, 1917.

Application filed April 18, 1916. Serial No. 91,931.

*To all whom it may concern:*

Be it known that I, GEORGE H. BAUMANN, a citizen of the United States, residing at Milwaukee, in the county of Milwaukee and State of Wisconsin, have invented new and useful Improvements in Combined Kettles and Strainers, of which the following is a specification.

This invention is an improved combined kettle and strainer for boiling and straining potatoes, and other vegetables, or food substances and for also straining the same, the object of the invention being to provide an improved cooking utensil of this kind embodying an outer vessel having a handle, an inner, strainer vessel also having a handle and adapted to be placed in and removed from the outer vessel, and means to detachably secure the inner and outer vessels together when the handles thereof are arranged in line with each other, as hereinafter described and claimed.

In the accompanying drawings:—

Figure 1 is a sectional perspective view of a combined cooking and straining vessel constructed and arranged in accordance with my invention and showing said vessels locked together.

Fig. 2 is a detail plan, showing the vessels arranged in unlocked position, ready to be detached from each other.

Fig. 3 is a detail sectional view on the plane indicated by the line 3—3 of Fig. 1.

The outer vessel 1 may be in the form of a kettle, sauce pan, or the like, is provided on one side with a pouring spout 2, and also has a handle 3, which projects outwardly from one side. A pair of locking lugs 4, 5, are arranged on the outer side of and extend upwardly from the vessel 1 and are opposite each other, the lug 4 being above the inner end of the handle 3. Said lugs have oppositely extending open slots 6.

The inner vessel 7 is here shown as a strainer, provided with a perforated bottom 8, the inner vessel is adapted to fit snugly in the outer vessel, has a handle 9 which extends outwardly from one side and also has a catch 10 which extends from the opposite side, said catch being secured on the inner side of the wall of said vessel 7.

When the vessel 7 is arranged in the vessel 1, and turns so that its handle 9 is directly over the handle 3, the handle 9 engages in the slot of the lug 4 and the catch 10 engages in the slot of the lug 5 so that said vessels are detachably locked together. By first turning the inner vessel to bring its handle out of line with the handle 3, the inner vessel becomes unlocked from the outer vessel and hence may be lifted therefrom. The act of lifting the inner vessel from the outer vessel, causes the potatoes, or other food substances in the inner vessel to be strained, as will be understood, so that they are ready to be put in a dish. This obviates the necessity of tilting the kettle to pour off the water from the potatoes, or other food substances.

When the inner vessel is in locked position in the outer vessel with its handle directly over that of the outer vessel, both handles may be grasped when using the kettle, and each handle reinforces the other.

Having described the invention, what is claimed is:

The herein described combined kettle and strainer comprising an outer vessel, a lug on the outer side of the outer vessel, projecting upwardly therefrom and provided in one side with an open slot, a handle for the outer vessel having a downturned portion at its inner end bearing against the outer side of the lower portion of said lug, common fastening devices for said lug and the downturned end of said handle and securing said lug and handle to said outer vessel, in combination with an inner vessel detachably fitted in the outer vessel and also having a handle to enter slot of said lug to lock the vessels together when their handles are in line with each other.

In testimony whereof I affix my signature in presence of two witnesses.

GEORGE H. BAUMANN.

Witnesses:
RICHARD ELSNER,
EVANGELINE ELSNER.

Copies of this patent may be obtained for five cents each, by addressing the "Commissioner of Patents, Washington, D. C."